US012661953B2

(12) United States Patent
Shimauchi

(10) Patent No.: US 12,661,953 B2
(45) Date of Patent: Jun. 23, 2026

(54) HYBRID ELECTRIC VEHICLE

(71) Applicant: TOYOTA JIDOSHA KABUSHIKI KAISHA, Toyota (JP)

(72) Inventor: Takayuki Shimauchi, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 267 days.

(21) Appl. No.: 18/734,116

(22) Filed: Jun. 5, 2024

(65) Prior Publication Data

US 2025/0074154 A1 Mar. 6, 2025

(30) Foreign Application Priority Data

Aug. 29, 2023 (JP) .................................. 2023-138630

(51) Int. Cl.
B60W 10/30 (2006.01)
B60H 1/00 (2006.01)
(Continued)

(52) U.S. Cl.
CPC ....... B60H 1/3208 (2013.01); B60H 1/00278 (2013.01); B60H 1/004 (2013.01); B60H 1/32281 (2019.05); B60K 11/02 (2013.01); B60K 11/06 (2013.01); B60H 2001/00307 (2013.01); B60H 2001/325 (2013.01); B60H 2001/3277 (2013.01); B60L 2240/425 (2013.01); B60W 10/30 (2013.01); B60W 30/182 (2013.01); F01P 7/02 (2013.01); F01P 7/14 (2013.01); F01P 2025/12 (2013.01); F25B 2700/195 (2013.01)

(58) Field of Classification Search
CPC ................ B60H 1/00278; B60H 1/004; B60H 1/00507; B60H 1/00642; B60H 1/3208; B60H 1/32281; B60H 2001/00307; B60H 2001/00614; B60H 2001/325; B60H 2001/3277; B60K 11/02; B60K 11/06; B60W 10/30; F25B 2700/195; F25B 2700/19–197; B60L 2240/425; F01P 7/02; F01P 7/14; F01P 2025/12
See application file for complete search history.

(56) References Cited

U.S. PATENT DOCUMENTS 9,212,599 B2 * 12/2015 Gao ........................ B60L 58/21
2007/0209612 A1 9/2007 Kojima
(Continued)

FOREIGN PATENT DOCUMENTS

JP H10-157451 A 6/1998
JP 2007-302207 A 11/2007
JP 2022-098122 A 7/2022

*Primary Examiner* — Tinh T Dang
(74) *Attorney, Agent, or Firm* — SoraIP, Inc.

(57) ABSTRACT

An HEV mode and a BEV mode is a hybrid electric vehicle capable of traveling, comprising: a radiator; an air conditioner including a condenser and a pressure sensor for performing air conditioning in a room; a cooling fan that operates in response to the rotation of the engine to blow cooling air to the radiator and the condenser; and a control unit that controls the operation of the engine and the air conditioner, wherein the control unit reduces the amount of heat dissipation of the condenser when the high pressure of the cooler detected by the pressure sensor during traveling in BEV mode becomes equal to or higher than the first pressure.

5 Claims, 6 Drawing Sheets

(51) Int. Cl.
| | |
|---|---|
| *B60H 1/32* | (2006.01) |
| *B60K 11/02* | (2006.01) |
| *B60K 11/06* | (2006.01) |
| *B60W 30/182* | (2020.01) |
| *F01P 7/14* | (2006.01) |
| *F01P 7/02* | (2006.01) |

(56) References Cited

U.S. PATENT DOCUMENTS

| | | | |
|---|---|---|---|
| 2015/0291008 A1* | 10/2015 | Seto | B60L 1/02 |
| | | | 62/208 |
| 2017/0145850 A1* | 5/2017 | Huscher | F01K 15/02 |
| 2019/0092134 A1* | 3/2019 | Vehr | B60H 1/00378 |
| 2021/0094530 A1* | 4/2021 | Sugihara | B60H 1/00271 |
| 2022/0194353 A1 | 6/2022 | Yokoyama et al. | |
| 2023/0249522 A1* | 8/2023 | Li | B60H 1/3225 |
| | | | 62/126 |

* cited by examiner

1

HYBRID ELECTRIC VEHICLE

CROSS-REFERENCE TO RELATED APPLICATION

This application claims priority to Japanese Patent Application No. 2023-138630 filed on Aug. 29, 2023, incorporated herein by reference in its entirety.

BACKGROUND

1. Technical Field

The present disclosure relates to control on an air conditioner of a hybrid electric vehicle.

2. Description of Related Art

There has been used a vehicle that dissipates heat from a condenser in a refrigeration cycle by a cooling fan driven by an engine. When the engine speed is low in such a vehicle, the amount of air blown to the condenser decreases and the pressure in the refrigeration cycle increases, which may cause the air conditioner to stop. Therefore, there has been proposed a vehicle in which an electric auxiliary fan is provided in addition to the cooling fan to be driven by the engine and, when the engine speed is low, the amount of air from the auxiliary fan is increased to obtain a sufficient amount of heat dissipation of the condenser (see, for example, Japanese Unexamined Patent Application Publication No. 10-157451 (JP 10-157451 A)).

SUMMARY

In recent years, there has been used a hybrid electric vehicle that can travel in a hybrid electric vehicle (HEV) mode in which the vehicle travels using an engine and a vehicle drive motor and in a battery electric vehicle (BEV) mode in which the engine is stopped and the vehicle travels using the motor. In such a hybrid electric vehicle, an electric cooling fan is provided to sufficiently dissipate from a condenser even when the vehicle is traveling in the BEV mode.

Even the hybrid electric vehicle described above may include a cooling fan to be driven by the engine to secure the amount of heat dissipation of a radiator that cools a coolant of the engine at the time of climbing or towing. In such a vehicle, the amount of air passing through the condenser decreases during the traveling in the BEV mode in which the engine is stopped. Therefore, the amount of heat dissipation of the condenser is not sufficiently obtained and the pressure in the refrigeration cycle increases, which may result in a case where the BEV traveling cannot be continued.

Therefore, the present disclosure has an object to reduce the amount of heat dissipation of a condenser during BEV traveling and continue the BEV traveling in a hybrid electric vehicle including a cooling fan to be driven by an engine.

A hybrid electric vehicle according to the present disclosure is configured to travel in a hybrid electric vehicle mode in which the hybrid electric vehicle travels using an engine and a vehicle drive motor and in a battery electric vehicle mode in which the engine is stopped and the hybrid electric vehicle travels using the motor. The hybrid electric vehicle includes: a radiator configured to cool a coolant that circulates inside the engine; an air conditioner including a compressor, a condenser configured to condense a refrigerant compressed by the compressor, and a pressure sensor configured to detect a pressure of the refrigerant compressed by the compressor, the air conditioner being configured to condition air in a vehicle cabin; a cooling fan configured to operate in response to rotation of the engine to send cooling air to the radiator and the condenser; and a control unit configured to control operations of the engine and the air conditioner. The control unit is configured to reduce an amount of heat dissipation of the condenser when the pressure of the refrigerant detected by the pressure sensor is equal to or higher than a predetermined first pressure during traveling in the battery electric vehicle mode.

Since the amount of heat dissipation of the condenser is reduced during the BEV traveling, it is possible to suppress the pressure increase of the refrigerant during the BEV traveling and to continue the BEV traveling.

In the hybrid electric vehicle according to the present disclosure, the control unit may be configured to maintain the battery electric vehicle mode as a traveling mode and reduce the amount of heat dissipation of the condenser when the pressure of the refrigerant detected by the pressure sensor is equal to or higher than the first pressure during the traveling in the battery electric vehicle mode and an outside air temperature is lower than a predetermined first temperature, and the control unit may be configured to switch the traveling mode from the battery electric vehicle mode to the hybrid electric vehicle mode by starting the engine and not to reduce the amount of heat dissipation of the condenser when the pressure of the refrigerant detected by the pressure sensor is equal to or higher than the first pressure during the traveling in the battery electric vehicle mode and the outside air temperature is equal to or higher than the first temperature.

Thus, it is possible to suppress the pressure increase of the refrigerant during the BEV traveling and to continue the BEV traveling. Further, it is possible to perform sufficient cooling by increasing the amount of heat dissipation of the condenser when the outside air temperature is high and cooling is required.

In the hybrid electric vehicle according to the present disclosure, the air conditioner may include an indoor fan configured to send air to the vehicle cabin, and a switching damper configured to switch between outside air introduction for introducing outside air into the vehicle cabin and inside air circulation for circulating air in the vehicle cabin, and the control unit may be configured to switch the switching damper to the inside air circulation and increase a duty of the indoor fan to reduce the amount of heat dissipation of the condenser.

By improving the efficiency of the refrigeration cycle in this way, the amount of heat dissipation of the condenser is reduced. Therefore, the amount of heat dissipation of the condenser can be reduced without impairing the comfort of occupants.

In the hybrid electric vehicle according to the present disclosure, the air conditioner may include an evaporator configured to cool air to be blown into the vehicle cabin by causing the refrigerant to flow inside the evaporator, and the control unit may be configured to, as the pressure of the refrigerant detected by the pressure sensor increases, increase a set value of a refrigerant temperature at an evaporator outlet and reduce an upper limit rotational speed of the compressor to reduce the amount of heat dissipation of the condenser.

By reducing the cooling load of the air conditioner in this way, the amount of heat dissipation of the condenser can be reduced and the BEV traveling can be continued.

In the hybrid electric vehicle according to the present disclosure, the control unit may be configured to, when the pressure of the refrigerant detected by the pressure sensor is higher than the first pressure and equal to or higher than a second pressure lower than an engine start pressure, reduce the duty of the indoor fan as the refrigerant temperature at the evaporator outlet increases to reduce the amount of heat dissipation of the condenser.

When the pressure of the refrigerant is higher than the second pressure though the efficiency of the refrigeration cycle is improved and the load of the air conditioner is reduced, the duty of the indoor fan is reduced and the load of the air conditioner is further reduced. Therefore, it is possible to suppress the pressure increase of the refrigerant more effectively and to continue the traveling in the BEV mode.

According to the present disclosure, it is possible to reduce the amount of heat dissipation of the condenser during the BEV traveling and continue the BEV traveling in the hybrid electric vehicle including the cooling fan to be driven by the engine.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1:
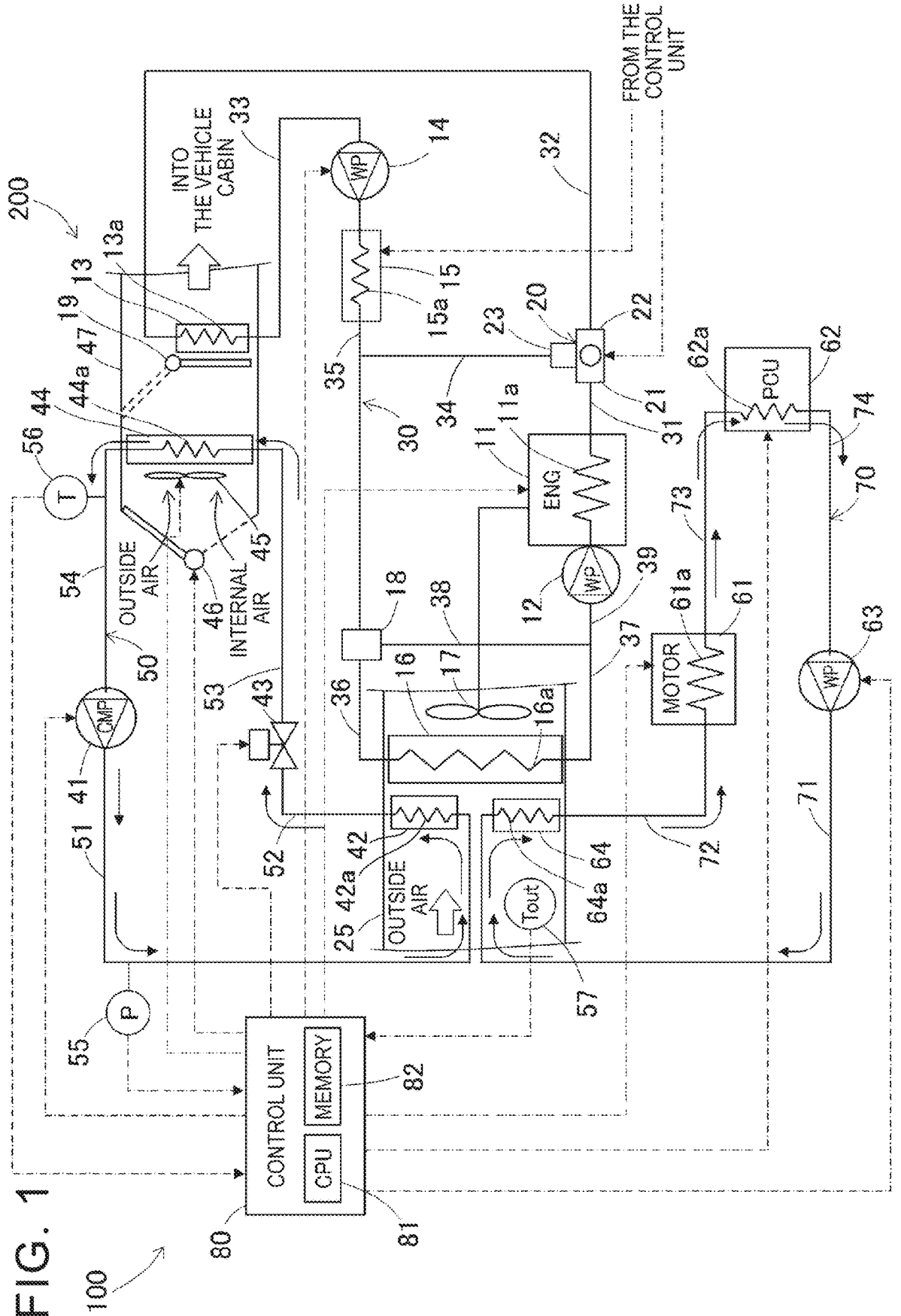
FIG. 1 is a system diagram illustrating a configuration of a hybrid electric vehicle according to an embodiment.

Hereinafter, hybrid electric vehicle 100 of embodiments will be described referring to the drawings. Hybrid electric vehicle 100 can travel in a HEV mode in which the engine 11 and the motor 61 for driving the vehicle travel, and in a BEV mode in which the engine 11 is stopped and the motor 61 travels.

As illustrated in FIG. 1, hybrid electric vehicle 100 includes an engine cooling circuit 30, a refrigeration cycle circuit 50, a motor cooling circuit 70, a control unit 80, and an outside air temperature sensor 57. The engine cooling circuit 30 is a circuit that circulates a coolant to the engine 11 to cool the engine 11. The refrigeration cycle circuit 50 is a circuit that compresses and expands the refrigerant to cool the vehicle cabin. The motor cooling circuit 70 is a circuit for cooling the motor 61 and PCU 62 by circulating a coolant to the motor 61 and PCU 62.

First, the engine cooling circuit 30 will be described. In the engine cooling circuit 30, an engine 11, a three-way flow rate control valve 20, a heater core 13, an electric pump 14, a water heater 15, a thermostat 18, and a radiator 16 are sequentially provided in series from the upstream side. The engine cooling circuit 30 is a flow path through which the coolant flows to each of these devices.

The engine 11 is a driving source of hybrid electric vehicle 100. The engine 11 is provided with a coolant flow path 11a through which coolant flows. An engine-driven pump 12 driven by the engine 11 is attached to the engine 11. The engine-driven pump 12 operates in conjunction with the engine 11. The discharge port of the engine-driven pump 12 is connected to the inlet of the coolant flow path 11a. The three-way flow rate control valve 20 is provided between the engine 11 and the heater core 13 of the engine cooling circuit 30. The three-way flow rate control valve 20 includes three ports: a first port 21, a second port 22, and a third port 23. The three-way flow rate control valve 20 can switch the flow path of the coolant by opening and closing the three ports respectively.

The heater core 13 is a heat exchanger that is provided with a coolant flow path 13a in which the high-temperature coolant that has passed through the coolant flow path 11a of the engine 11 flows, and heats the air to be blown to the vehicle cabin. The heater core 13 is disposed in a blow-out duct 47 that blows air into the vehicle cabin. A flow path switching damper 19 is provided upstream of the heater core 13 in the blow-out duct 47 to switch between interruption and opening of air flow to the heater core 13.

The electric pump 14 is driven by a motor (not shown) and circulates coolant to the engine cooling circuit 30. The water heater 15 is a heater for warming the coolant passing through the heater core 13 when hybrid electric vehicle 100 travels in BEV mode. That is, the water heater 15 is a heat source that heats the vehicle cabin when hybrid electric vehicle 100 travels in BEV mode. The water heater 15 includes a coolant flow path 15a through which coolant flows.

The thermostat 18 is a switching valve that switches the flow of the coolant to the radiator bypass pipe 38 when the temperature of the coolant is low, and switches the flow path so that the coolant flows to the radiator 16 when the temperature of the coolant is high.

The radiator 16 is a heat exchanger that cools the coolant by the outside air. The radiator 16 includes a coolant flow path 16a through which coolant flows. The radiator 16 is mounted on a radiator support 25 arranged in a front compartment in front of the vehicle. The radiator support 25 covers four rounds of the radiator 16 and constitutes an air guide path for introducing outside air. A cooling fan 17 that operates by the rotation of the engine 11 and blows cooling air to the radiator 16 is disposed behind the radiator 16.

The engine cooling circuit 30 includes an engine-driven pump 12, a coolant flow path 11a of the engine 11, an engine outlet pipe 31, a three-way flow rate control valve 20, a heater core inlet pipe 32, a coolant flow path 13a of the heater core 13, a heater core outlet pipe 33, an electric pump 14, a coolant flow path 15a of the water heater 15, a water heater outlet pipe 35, a thermostat 18, a radiator inlet pipe 36, a coolant flow path 16a of the radiator 16, a radiator outlet pipe 37, an engine-driven pump inlet pipe 39, a radiator bypass pipe 38, and an engine bypass pipe 34.

The engine outlet pipe 31 connects the outlet of the coolant flow path 11a of the engine 11 to the first port 21 of the three-way flow rate control valve 20. The heater core inlet pipe 32 connects the second port 22 of the three-way flow rate control valve 20 to the inlet of the coolant flow path 13*a* of the heater core 13. The heater core outlet pipe 33 connects the outlet of the coolant flow path 13*a* of the heater core 13 and the suction port of the electric pump 14. The discharge port of the electric pump 14 is connected to the inlet of the coolant flow path 15*a* of the water heater 15. The water heater outlet pipe 35 connects the outlet of the coolant flow path 15*a* of the water heater 15 to the thermostat 18. The radiator inlet pipe 36 connects the thermostat 18 and the inlet of the coolant flow path 16*a* of the radiator 16. The radiator outlet pipe 37 connects the outlet of the coolant flow path 16*a* of the radiator 16 to the engine-driven pump inlet pipe 39. The engine-driven pump inlet pipe 39 is connected to a suction port of the engine-driven pump 12. The radiator bypass pipe 38 bypasses the radiator 16 to connect the thermostat 18 and the engine-driven pump inlet pipe 39. The engine bypass pipe 34 connects the water heater outlet pipe 35 of the engine cooling circuit 30 and the third port 23 of the three-way flow rate control valve 20 so as to bypass the engine 11.

Next, the refrigeration cycle circuit 50 will be described. The refrigeration cycle circuit 50 includes a compressor 41, a compressor outlet pipe 51, a condenser 42, a condenser outlet pipe 52, an expansion valve 43, an evaporator inlet pipe 53, an evaporator 44, and an evaporator outlet pipe 54.

The compressor 41 compresses the refrigerant to form a high-temperature, high-pressure gas. The condenser 42 has a refrigerant flow path 42*a* therein, exchanges heat with the outside air flowing outside, and cools and condenses the high-temperature and high-pressure gas refrigerant compressed by the compressor 41 to form a liquid. The discharge port of the compressor 41 and the inlet of the refrigerant flow path 42*a* of the condenser 42 are connected by a compressor outlet pipe 51. The condenser 42 is attached to the radiator support 25 in series with the radiator 16 in the flowing direction of the outside air upstream of the radiator 16. The cooling fan 17 described above also blows cooling air to the condenser 42.

The expansion valve 43 is a pressure reducing valve that adiabatically expands the refrigerant that has become a high-pressure liquid in the condenser 42. The expansion valve 43 is connected to the outlet of the refrigerant flow path 42*a* of the condenser 42 by the condenser outlet pipe 52.

The evaporator 44 includes a refrigerant flow path 44*a* therein, and cools the refrigerant flowing through the outside by vaporizing the refrigerant flowing through the refrigerant flow path 44*a*. The evaporator 44 is connected to the expansion valve 43 by an evaporator inlet pipe 53. Like the heater core 13, the evaporator 44 is disposed upstream of the heater core 13 in the blow-out duct 47 that blows air into the vehicle cabin. An indoor fan 45 for blowing air into the vehicle cabin is disposed upstream of the evaporator 44 in the blow-out duct 47. Upstream of the indoor fan 45, a switching damper 46 for switching between the outside air introduction for introducing the outside air into the indoor fan 45 and the inside air circulation for introducing the air in the vehicle cabin into the indoor fan 45 is provided. In the case where the switching damper 46 is the outside air introduction, the outside air is introduced into the indoor fan 45, and the outside air passes through the evaporator 44, becomes cold air, and is blown to the vehicle cabin. On the other hand, when the switching damper 46 is an internal air circulation, the air in the vehicle cabin is introduced into the indoor fan 45, and the air in the vehicle cabin passes through the evaporator 44, becomes cold air, and is blown out to the vehicle cabin. The outlet of the refrigerant flow path 44*a* of the evaporator 44 is connected to the suction port of the compressor 41 by an evaporator outlet pipe 54.

The compressor 41, the condenser 42, the expansion valve 43, and the evaporator 44 constitute a refrigeration cycle in which the refrigerant is compressed and expanded to cool the vehicle cabin. The section between the outlet of the compressor 41 and the inlet of the expansion valve 43 is a high-pressure region where the pressure of the refrigerant is high. On the other hand, between the outlet of the expansion valve 43 and the suction port of the compressor 41 is a low-pressure region in which the pressure of the refrigerant is low. The compressor outlet pipe 51 is provided with a pressure sensor 55 for detecting the pressure of the refrigerant in the high-pressure region. The refrigerant pressure detected by the pressure sensor 55 is referred to as "cooler high pressure". Further, the evaporator outlet pipe 54 is provided with a temperature sensor 56 for detecting the refrigerant temperature at the outlet of the evaporator 44.

Further, the compressor 41, the condenser 42, the expansion valve 43, the evaporator 44, the indoor fan 45, the switching damper 46, the heater core 13, the flow path switching damper 19, the pressure sensor 55, and the temperature sensor 56 constitute an air conditioner 200.

Next, the motor cooling circuit 70 will be described. The motor cooling circuit 70 includes a motor 61, a motor outlet pipe 73, a PCU 62, a PCU outlet pipe 74, a coolant pump 63, a coolant pump outlet pipe 71, a HEV radiator 64, and a motor inlet pipe 72.

The motor 61 is a motor for driving hybrid electric vehicle 100. The motor 61 includes a coolant flow path 61*a* through which the coolant flows. PCU 62 converts DC power supplied from a battery (not shown) into AC power and supplies the AC power to the motor 61, and when the motor 61 functions as a generator, converts AC power generated by the motor 61 into DC power to charge the battery. PCU 62 includes a coolant flow path 62*a* through which the coolant flows. The coolant flow path 62*a* of PCU 62 is connected to the coolant flow path 61*a* of the motor 61 by the motor outlet pipe 73. HEV radiator 64 includes a coolant flow path 64*a* through which a coolant flows, exchanges heat with outside air flowing outward, and cools a high-temperature coolant. HEV radiator 64 is mounted to the radiator support 25 in parallel with the condenser 42 in series with the direction of flow of the radiator 16 and the outside air upstream of the radiator 16. The cooling fan 17 also blows cooling air to HEV radiator 64. An inlet of the coolant flow path 64*a* of HEV radiator 64 is connected to a discharge port of the coolant pump 63 by a coolant pump outlet pipe 71. Further, the outlet of the coolant flow path 64*a* of HEV radiator 64 is connected to the coolant flow path 61*a* of the motor 61 by the motor inlet pipe 72. The motor cooling circuit 70 circulates the motor 61, PCU 62, and HEV radiator 64 by the coolant pump 63, and cools the motor 61 and PCU 62 by radiating the heat generated by the motor 61 and PCU 62 by HEV radiator 64.

The outside air temperature sensor 57 detects the outside air temperature of hybrid electric vehicle 100. The outside air temperature sensor 57 may be provided in the vicinity of the outside air inlet of the radiator support 25, for example.

The control unit 80 is a computer including a CPU 81 that is a processor that performs information processing therein, and a memory 82 that stores operation programs, operation data, and the like. The engine 11, the three-way flow rate control valve 20, the electric pump 14, the water heater 15, the compressor 41, the expansion valve 43, the indoor fan 45, the switching damper 46, the motor 61, PCU 62, and the coolant pump 63 are connected to the control unit 80 and operate according to a command from the control unit 80. Further, the cooler high pressure detected by the pressure sensor 55, the refrigerant temperature at the evaporator outlet detected by the temperature sensor 56, and the outside air temperature detected by the outside air temperature sensor 57 are input to the control unit 80. The operation of the control unit 80 is realized by CPU 81 executing a control program stored in the memory 82.

Figure 2:
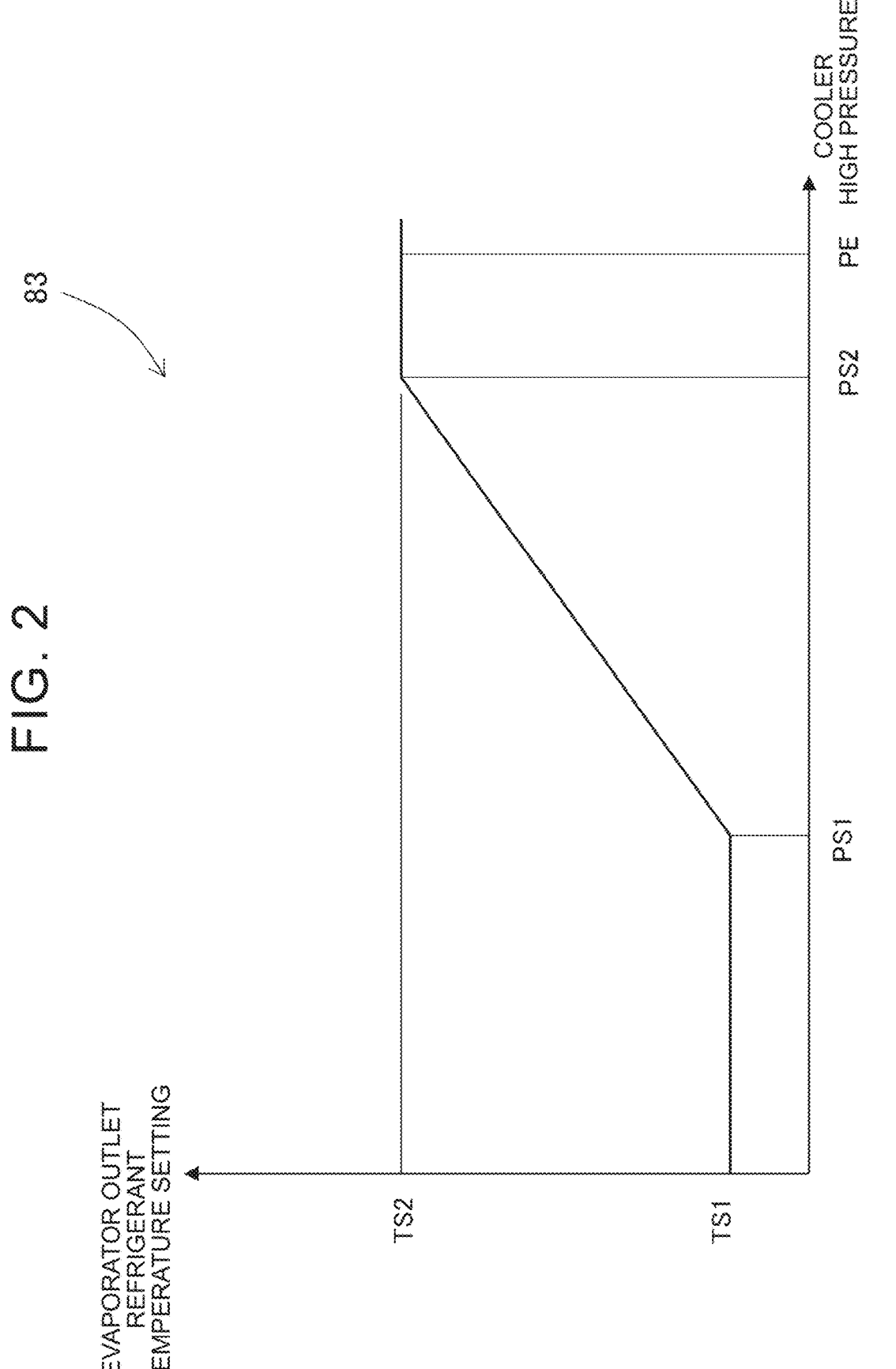
FIG. 2 is a map showing the relation of the refrigerant-temperature setpoint at the outlet of the evaporator to the cooler high pressure stored in the memory of the control unit of hybrid electric vehicle shown in FIG. 1.
Figure 3:
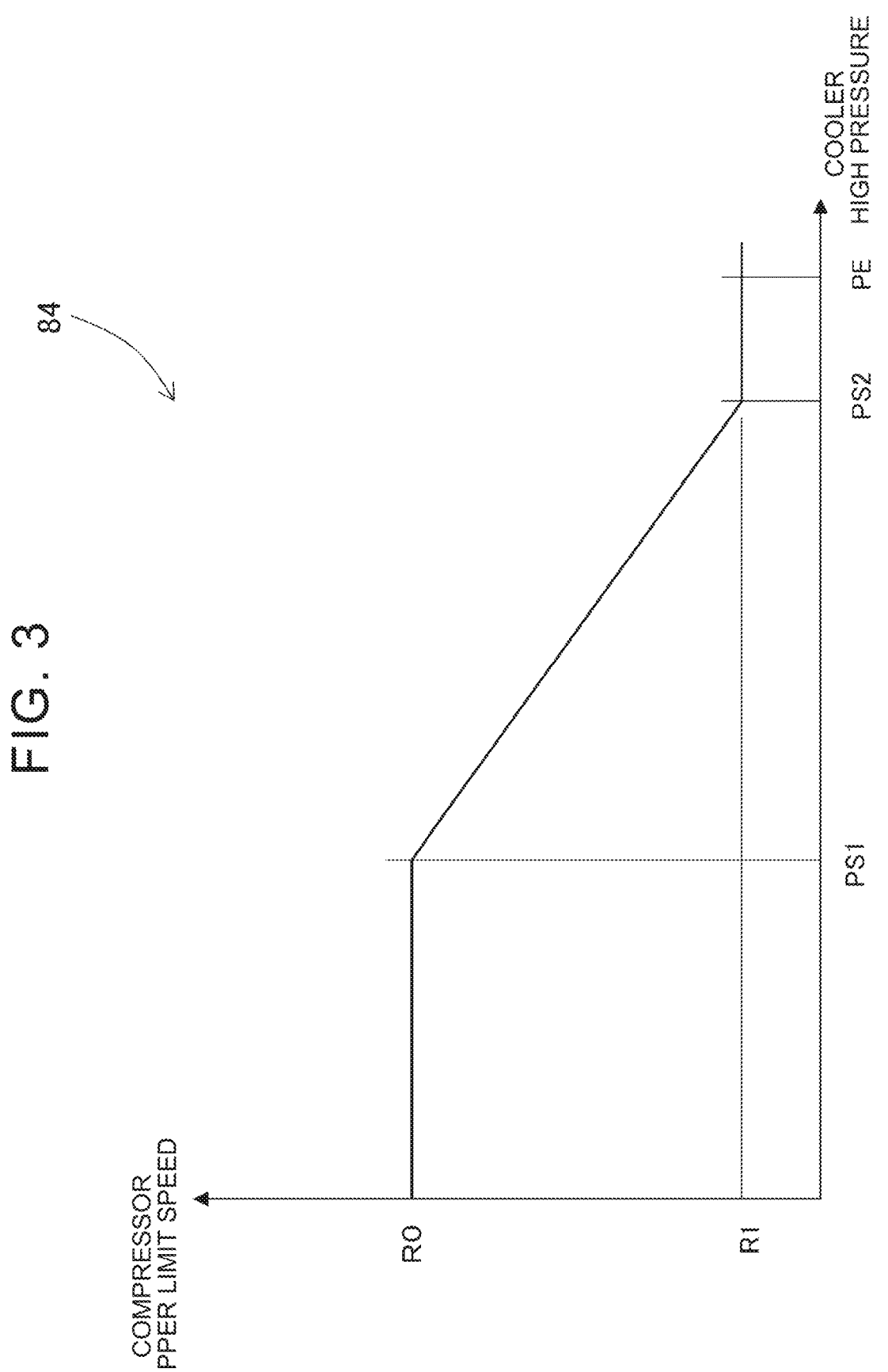
FIG. 3 is a map showing the relation between the compressor upper limit rotational speed and the cooler high pressure stored in the memory of the control unit of hybrid electric vehicle shown in FIG. 1.
Figure 4:
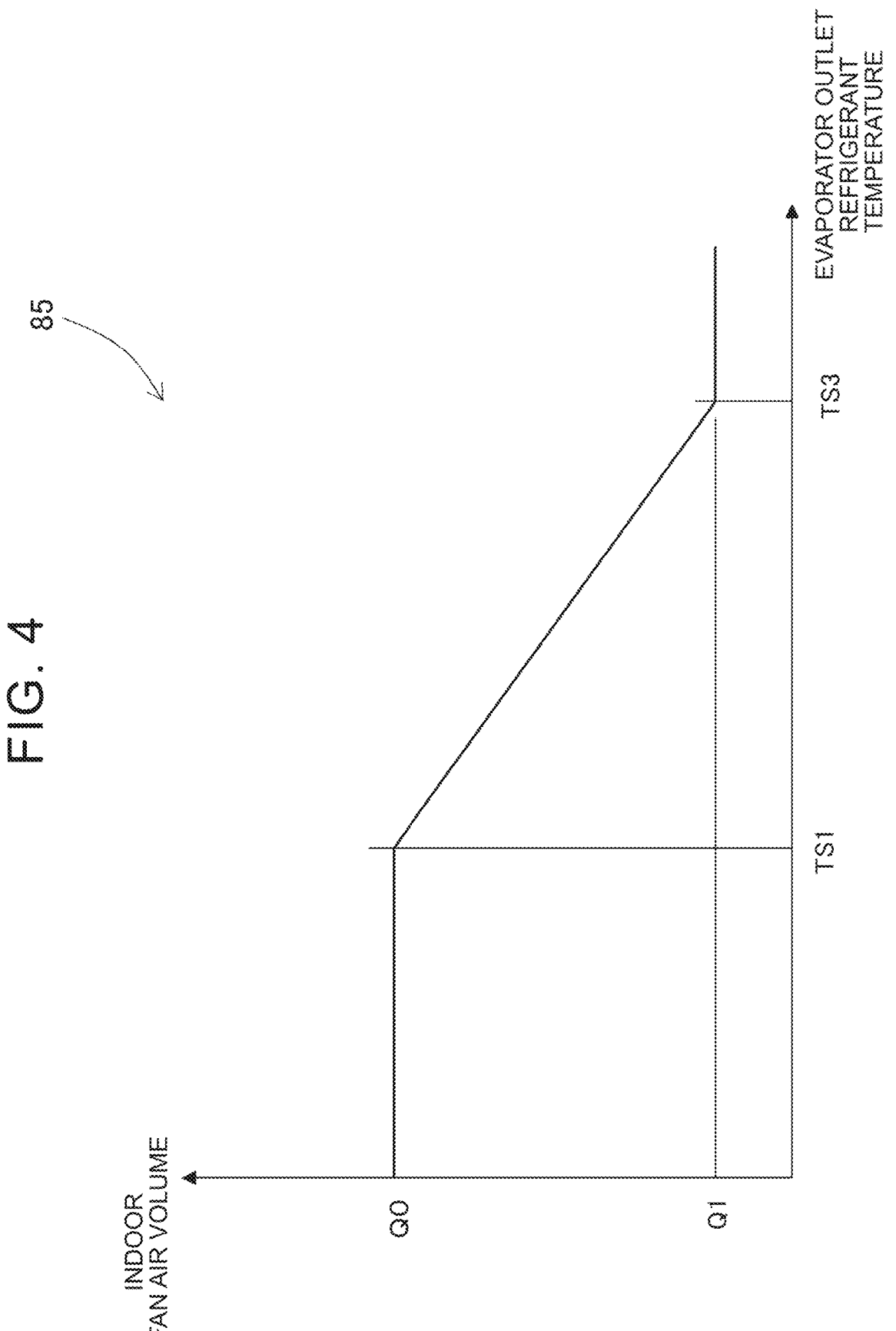
FIG. 4 is a map showing the air volume of the indoor fan with respect to the refrigerant temperature at the evaporator outlet stored in the memory of the control unit of hybrid electric vehicle shown in FIG. 1.

The memory 82 of the control unit 80 stores control maps 83 to 85 shown in FIGS. 2 to 4. As illustrated in FIG. 2, the control map 83 is a map that defines a relationship between the set value of the refrigerant temperature at the outlet of the evaporator 44 and the cooler high pressure detected by the pressure sensor 55. In FIG. 2, the first pressure PS1 is a predetermined set pressure at which the condenser heat dissipation reduction process described later is started. The engine start pressure PE is a set pressure at which the engine 11 is started by an increase in the high-pressure of the cooler, and the vehicle travels in HEV mode. The second pressure PS2 is a pressure higher than the first pressure PS1 and slightly lower than the engine start pressure PE, and is a predetermined set pressure for starting the reduction of the air volume of the indoor fan 45. The control map 83 is a map in which the set value of the refrigerant temperature at the outlet of the evaporator 44 is increased from TS1 of the normal set temperature when the high pressure of the cooler becomes equal to or higher than the first pressure, and the set value of the refrigerant temperature at the outlet of the evaporator 44 is set to a TS2 higher than TS1 when the high pressure of the cooler becomes equal to or higher than the second pressure PS2.

The control map 84 illustrated in FIG. 3 is a map that defines the relationship between the upper limit rotational speed of the compressor 41 and the cooler high pressure. The control map 84 is a map in which the upper limit rotational speed of the compressor 41 is reduced from the normal upper limit rotational speed RO when the cooler high pressure is equal to or higher than the first pressure, and the upper limit rotational speed of the compressor 41 is RI when the cooler high pressure is equal to or higher than the second pressure PS2.

The control map 85 shown in FIG. 4 is a map that defines the relationship between the refrigerant temperature at the outlet of the evaporator 44 and the air volume of the indoor fan 45. The control map 85 is a map in which the air volume of the indoor fan 45 is reduced from the normal set Q0 when the refrigerant temperature at the outlet of the evaporator 44 becomes equal to or higher than TS1, and the air volume of the indoor fan 45 is taken as Q1 when the refrigerant temperature at the outlet of the evaporator 44 becomes equal to or higher than TS3.

Next, referring to FIG. 5, the control of the air conditioner 200 while hybrid electric vehicle 100 is traveling in BEV mode while cooling the vehicle cabin with the air conditioner 200 will be described. When the traveling mode of hybrid electric vehicle 100 is BEV mode, the engine 11 is stopped, so that the coolant does not flow to the engine cooling circuit 30, and the cooling fan 17 driven by the engine 11 is stopped. On the other hand, since the motor 61 is driven, the motor 61, PCU 62, and HEV radiator 64 are cooled by the coolant pump 63 by circulating the coolant as indicated by arrows in FIG. 1, the motor 61 and PCU 62. Further, since the cooling of the vehicle cabin is performed, the compressor 41 is operated and the refrigerant circulates as indicated by an arrow in FIG. 1, and heat is radiated from the condenser 42 to the outside air.

Figure 5:
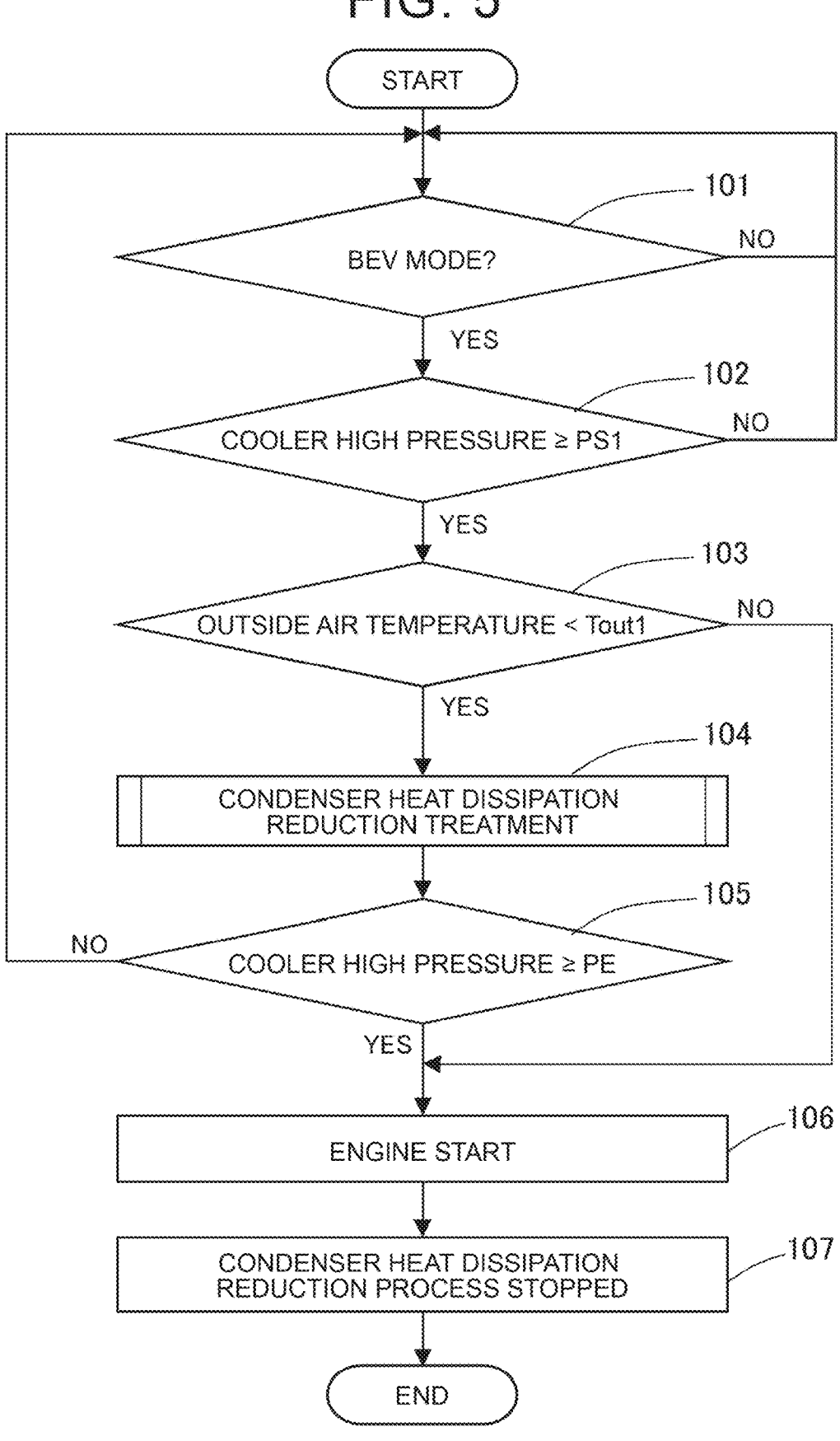
FIG. 5 is a flow chart showing the operation of hybrid electric vehicle shown in FIG. 1.

As shown in step 101 of FIG. 5, the control unit 80 determines whether or not hybrid electric vehicle 100 is traveling in BEV mode. When determining NO in step 101 of FIG. 5, the control unit 80 waits while repeatedly executing step 101 of FIG. 5.

When determining YES in step 101 of FIG. 5, the control unit 80 proceeds to step 102 of FIG. 5 to determine whether or not the cooler high pressure detected by the pressure sensor 55 is equal to or higher than the first pressure PS1. When determining NO in step 102 of FIG. 5, the control unit 80 returns to step 101 of FIG. 5 and repeatedly executes steps 101 and 102 to wait. On the other hand, when the control unit 80 determines YES in step 102 of FIG. 5, the process proceeds to step 103 of FIG. 5. Here, the first pressure PS1 is a predetermined set pressure for starting the condenser heat dissipation reduction process, can be freely set, for example, may be set to about 80% from 70 of the engine start pressure PE.

In step 103 of FIG. 5, the control unit 80 determines whether the outside air temperature detected by the outside air temperature sensor 57 is less than the first temperature Tout1. The first temperature Tout1 is a temperature at which the outside air temperature is high and the cooling of the vehicle cabin needs to be prioritized by starting the engine 11 and increasing the amount of heat dissipation from the condenser 42. The first thermal Tout1 can be freely set, but may be set to, for example, about 40° C. to 45° C.

When the control unit 80 determines YES in step 103 of FIG. 5, that is, when the outside air temperature is not so high as to prioritize cooling of the vehicle cabin, the control unit proceeds to step 104 of FIG. 5 and performs a condenser heat dissipation reduction process to be described later, continues EV travel, and proceeds to step 105 of FIG. 5.

In step 105 of FIG. 5, the control unit 80 determines whether the cooler high pressure is equal to or higher than the engine start pressure PE. As described above, the engine start pressure PE is a pressure that requires the engine 11 to be started by an increase in the high pressure of the cooler, to move to HEV mode, and to increase the heat dissipation amount of the condenser 42.

When determining NO in step 105 of FIG. 5, the control unit 80 returns to step 101 of FIG. 5 and repeatedly executes steps 101 to 105. At this time, the control unit 80 continues EV running in which the engine 11 is stopped.

On the other hand, when the control unit 80 determines YES in step 105 of FIG. 5, the process proceeds to step 106 of FIG. 5 to start the engine 11 to change the traveling mode from BEV mode to HEV mode, and the condenser heat dissipation amount reduction process is stopped in step 107 of FIG. 5. When the engine 11 is started, the cooling fan 17 operates, and the air volume of the outside air passing through the condenser 42 increases. As a result, the amount of heat dissipation of the condenser 42 can be increased, and the high pressure of the cooler can be reduced.

In addition, when the control unit 80 determines NO in step 103 of FIG. 5, that is, when the outside air temperature becomes equal to or higher than the first temperature Tout1, the process proceeds to step 106 of FIG. 5 to start the engine 11 to switch the traveling mode to HEV mode, and the condenser heat dissipation amount reduction process is stopped in step 107 of FIG. 5.

Next, with reference to FIG. 6, the condenser heat dissipation amount reduction process in step 104 of FIG. 5 will be described.

Figure 6:
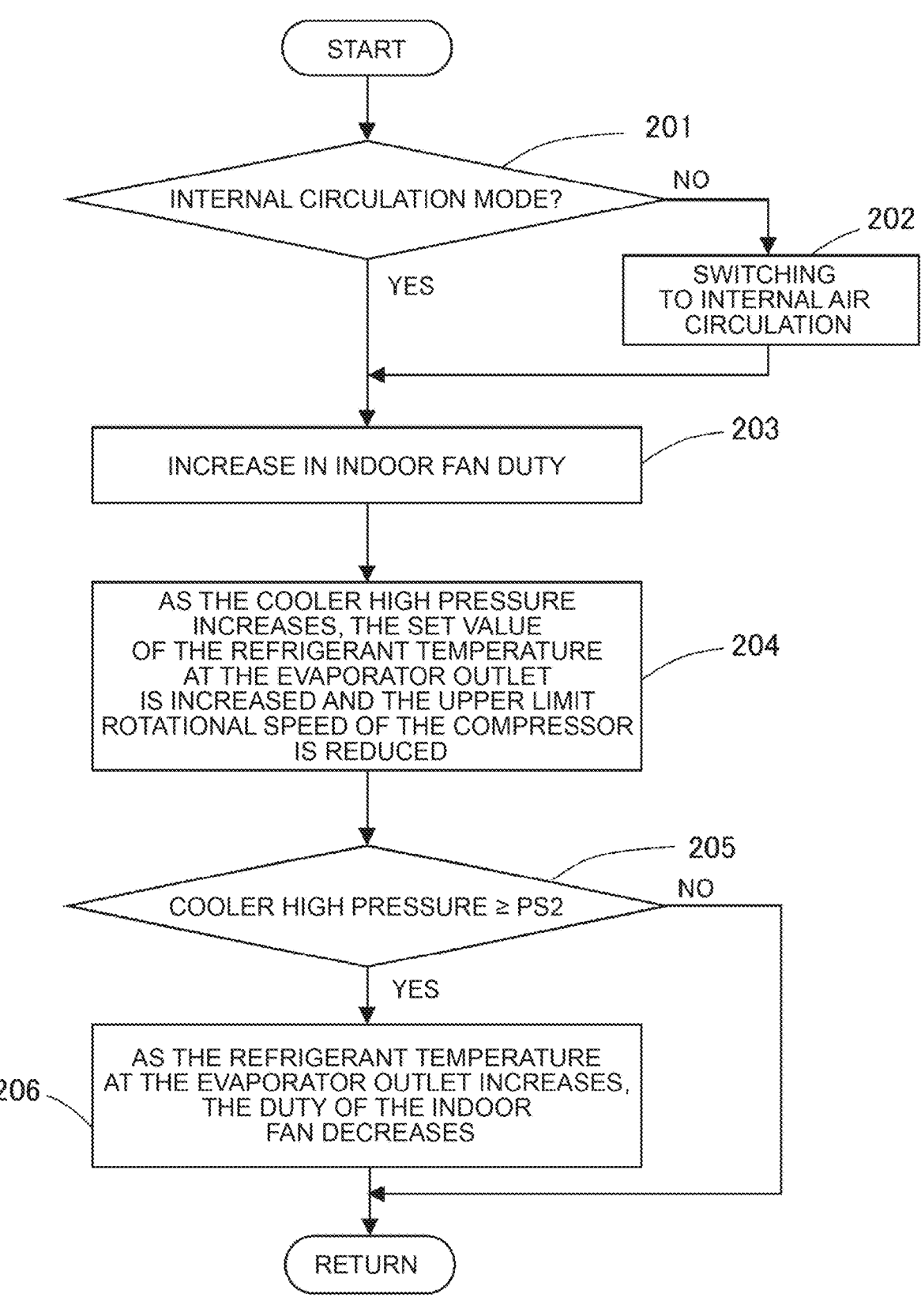
FIG. 6 is a flowchart showing an operation of the condenser heat dissipation amount reduction process shown in FIG. 5.

As shown in step 201 of FIG. 6, the control unit 80 determines whether or not the switching damper 46 is switching to the internal air circulation. If the control unit 80 determines YES in step 201 of FIG. 6, the process proceeds to step 203 of FIG. 6. On the other hand, when the control unit 80 determines NO in step 201 of FIG. 6, the process proceeds to step 202 of FIG. 6 to switch the switching damper 46 to the internal air circulation, and the process proceeds to step 203 of FIG. 2.

The control unit 80 increases the duty of the indoor fan 45 in step 203 of FIG. 6. The increase in the duty may be increased to such an extent that the occupant does not worry about the noise of the fan, or may be increased to the maximum duty.

As described above, by increasing the duty of the indoor fan 45 as the indoor air circulation to increase the flow rate of the air circulating in the vehicle cabin, it is possible to suppress an increase in the high pressure of the cooler by reducing the amount of heat dissipation of the condenser 42 without impairing the comfort of the occupant by keeping the temperature in the room low.

Next, the control unit 80 proceeds to step 204 of FIG. 6, applies the control map 83 shown in FIG. 2, and increases the set value of the refrigerant temperature at the outlet of the evaporator 44 as the cooler high pressure increases. As a result, the amount of heat exchange between the evaporator 44 and the air blown into the vehicle cabin is reduced, and the load on the air conditioner 200 is reduced. Therefore, the amount of heat dissipation from the condenser 42 to the outside air is reduced, and the high pressure of the cooler can be reduced.

Further, the control unit 80 applies the control map 84 illustrated in FIG. 3 to reduce the upper limit rotational speed of the compressor 41 as the cooler high pressure increases. As a result, the pressure of the refrigerant at the outlet of the compressor 41 decreases, and the cooler high pressure decreases.

Then, the control unit 80 proceeds to step 205 of FIG. 6 to determine whether the high cooler pressure detected by the pressure sensor 55 is equal to or higher than the second pressure PS2. Here, the second pressure PS2 is a pressure slightly lower than the engine start pressure PE. That is, the control unit 80, even after performing the process of step 201 to step 204 in FIG. 6, if the cooler pressure has risen to just before the engine start pressure PE, it is determined YES in step 205 in FIG. 6, and proceeds to step 206 in FIG. 6.

Then, the control unit 80, in step 206 of FIG. 6, by applying the control map 85 shown in FIG. 4, reduces the duty of the indoor fan 45 as the refrigerant temperature at the outlet of the evaporator 44 increases to reduce the air volume of the indoor fan 45. As a result, the amount of heat exchange between the evaporator 44 and the air blown into the vehicle cabin is further reduced, and the load on the air conditioner 200 is reduced. Therefore, the amount of heat dissipation from the condenser 42 to the outside air is reduced, and the high pressure of the cooler can be further reduced.

On the other hand, when determining NO in step 205 of FIG. 6, the control unit 80 ends the evaporator heat dissipation reduction process without performing the process of step 206 of FIG. 6.

As described above, in hybrid electric vehicle 100 of the embodiment, since the amount of heat dissipation of the condenser 42 is reduced during EV running, it is possible to suppress an increase in the high pressure of the cooler during EV running and to continue EV running. Further, in hybrid electric vehicle 100 of the embodiment, when the outside air temperature is high and cooling is required, the engine 11 is started to increase the amount of heat dissipation of the condenser 42, so that adequate cooling can be performed.

Further, in hybrid electric vehicle 100 of the embodiment, the inflow of the air in the vehicle cabin is made into the internal air circulation, and the duty of the indoor fan 45 is increased, thereby improving the efficiency of the refrigeration cycle and reducing the amount of heat dissipation of the condenser 42. Accordingly, the amount of heat dissipation of the condenser 42 can be reduced without impairing the comfort of the occupant.

Further, in hybrid electric vehicle 100 of the embodiment, as the cooler high pressure increases, the set value of the refrigerant temperature at the outlet of the evaporator 44 is increased, and the upper limit rotational speed of the compressor 41 is reduced. Accordingly, the cooling load of the air conditioner 200 can be reduced, and the amount of heat dissipation of the condenser 42 can be reduced.

Further, hybrid electric vehicle 100 of the embodiment reduces the duty of the indoor fan 45 and further reduces the load on the air conditioner 200 when the high cooler pressure is higher than the second pressure PS2 immediately before the engine start pressure PE even if the refrigeration cycle is improved and the load on the air conditioner 200 is reduced. Therefore, it is possible to more effectively suppress an increase in the high-pressure of the cooler and to continue traveling in BEV mode.

What is claimed is:

1. A hybrid electric vehicle configured to travel in a hybrid electric vehicle mode in which the hybrid electric vehicle travels using an engine and a vehicle drive motor and in a battery electric vehicle mode in which the engine is stopped and the hybrid electric vehicle travels using the motor, the hybrid electric vehicle comprising:

a radiator configured to cool a coolant that circulates inside the engine;

an air conditioner including a compressor, a condenser configured to condense a refrigerant compressed by the compressor, and a pressure sensor configured to detect a pressure of the refrigerant compressed by the compressor, the air conditioner being configured to condition air in a vehicle cabin;

a cooling fan configured to operate in response to rotation of the engine to send cooling air to the radiator and the condenser; and a control unit configured to control operations of the engine and the air conditioner, wherein the control unit is configured to reduce an amount of heat dissipation of the condenser when the pressure of the refrigerant detected by the pressure sensor is equal to or higher than a predetermined first pressure during traveling in the battery electric vehicle mode.

2. The hybrid electric vehicle according to claim 1, wherein:

the control unit is configured to maintain the battery electric vehicle mode as a traveling mode and reduce the amount of heat dissipation of the condenser when the pressure of the refrigerant detected by the pressure sensor is equal to or higher than the first pressure during the traveling in the battery electric vehicle mode and an outside air temperature is lower than a predetermined first temperature; and the control unit is configured to switch the traveling mode from the battery electric vehicle mode to the hybrid electric vehicle mode by starting the engine and not to reduce the amount of heat dissipation of the condenser when the pressure of the refrigerant detected by the pressure sensor is equal to or higher than the first pressure during the traveling in the battery electric vehicle mode and the outside air temperature is equal to or higher than the first temperature.

3. The hybrid electric vehicle according to claim 2, wherein:

the air conditioner includes an indoor fan configured to send air to the vehicle cabin, and a switching damper configured to switch between outside air introduction for introducing outside air into the vehicle cabin and inside air circulation for circulating air in the vehicle cabin; and the control unit is configured to switch the switching damper to the inside air circulation and increase a duty of the indoor fan to reduce the amount of heat dissipation of the condenser.

4. The hybrid electric vehicle according to claim 3, wherein:

the air conditioner includes an evaporator configured to cool air to be blown into the vehicle cabin by causing the refrigerant to flow inside the evaporator; and the control unit is configured to, as the pressure of the refrigerant detected by the pressure sensor increases, increase a set value of a refrigerant temperature at an evaporator outlet and reduce an upper limit rotational speed of the compressor to reduce the amount of heat dissipation of the condenser.

5. The hybrid electric vehicle according to claim 4, wherein the control unit is configured to, when the pressure of the refrigerant detected by the pressure sensor is higher than the first pressure and equal to or higher than a second pressure lower than an engine start pressure, reduce the duty of the indoor fan as the refrigerant temperature at the evaporator outlet increases to reduce the amount of heat dissipation of the condenser.

* * * * *